United States Patent [19]

Ishikawa et al.

[11] Patent Number: 5,964,622
[45] Date of Patent: Oct. 12, 1999

[54] MOLDED ARTICLE HAVING ELECTRICAL CONNECTION AND METHOD FOR MOLDING SAME

[75] Inventors: Tomonori Ishikawa; Kiyoshi Nagata, both of Anjo, Japan

[73] Assignee: Denso Corporation, Japan

[21] Appl. No.: 08/814,822

[22] Filed: Mar. 11, 1997

[30] Foreign Application Priority Data

Mar. 12, 1996 [JP] Japan ................................. 8-055169
Jan. 29, 1997 [JP] Japan ................................. 9-015364

[51] Int. Cl.⁶ ............................................. H01R 13/504
[52] U.S. Cl. ............................................. 439/606
[58] Field of Search .................... 439/604, 605, 439/606, 106, 695

[56] References Cited

U.S. PATENT DOCUMENTS 2,949,641  8/1960  Quackenbush ........................ 439/606
4,310,208  1/1982  Webster et al. ........................ 439/606
4,884,980  12/1989  Bensing et al. ....................... 439/606
5,453,029  9/1995  Moldenhauer et al. ............... 439/606

FOREIGN PATENT DOCUMENTS 4-113023  10/1992  Japan.

Primary Examiner—Steven L. Stephan
Assistant Examiner—Eugene G. Byrd
Attorney, Agent, or Firm—Pillsbury Madison & Sutro

[57] ABSTRACT

The present invention provides a molded article obtained by insert molding an electrical connection 1 having a plurality of metal terminals 4 from a synthetic resin while the metal terminals 4 are being used as inserts. A primary molded article 7 having a plurality of metal terminals 4 as inserts is obtained by conducting insert molding in such a manner that a connecting portion connects the metal terminals 4, and a molded article is obtained by conducting insert molding while the primary molded article 7 is being used as an insert. Recesses 6a are formed in the mid positions of the connecting portion 6 which connects the metal terminals 4, and as a result edges 6b are formed.

7 Claims, 4 Drawing Sheets

Fig. 1
Fig. 2
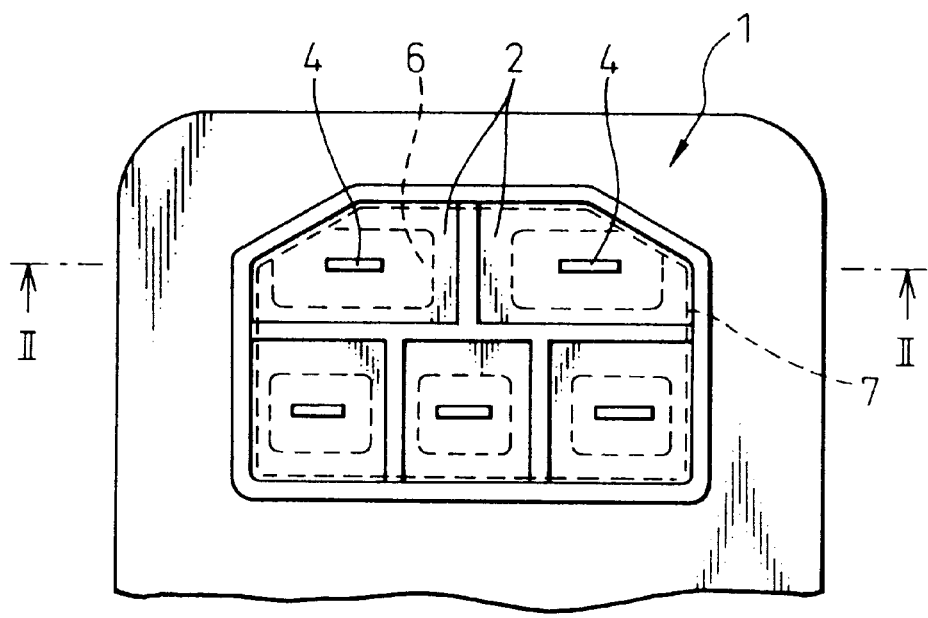
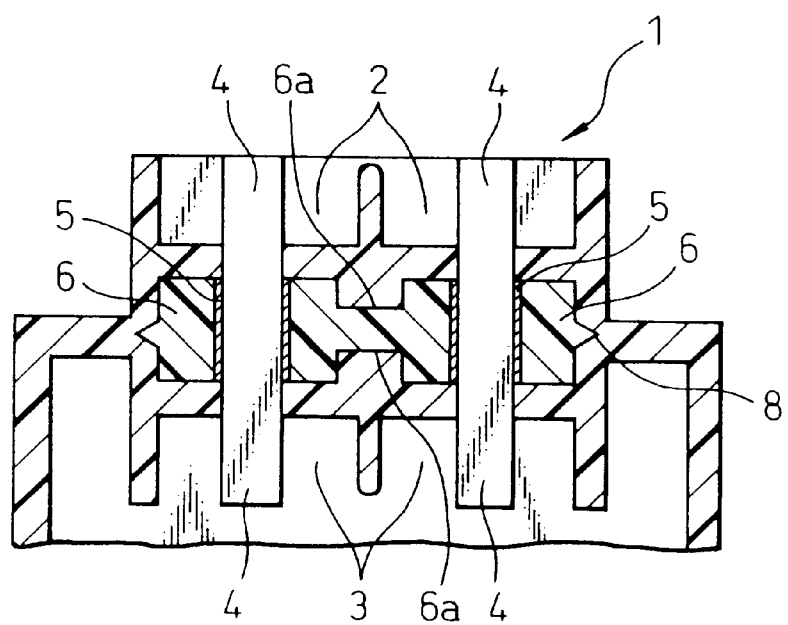

5,964,622

MOLDED ARTICLE HAVING ELECTRICAL CONNECTION AND METHOD FOR MOLDING SAME

BACKGROUND OF THE INVENTION

1. Field of the Invention

The present invention relates to a molded article having an electrical connection provided with a plurality of metal terminals, and a method for molding the same.

2. Description of the Related Art

A flange structure of a fuel sender for a vehicle has been proposed as a molded article in Japanese Unexamined Utility Model Publication (Kokai) No. 4-113023. The flange structure is produced by insert molding from a synthetic resin, while a plurality of metal terminals are being used as inserts, in such a manner that a plurality of the metal terminals penetrate the flange and are fixed thereto. An unevenness is formed on part of the surface of the metal terminals to be contacted with the synthetic resin, and the uneven surface is coated with an adhesive having elasticity.

However, when such a molded article having an electrical connection as mentioned above is prepared by injection molding a resin, a plurality of the metal terminals must be accurately positioned within a mold as inserts. As a result, the molding operation causes problems in that the operation becomes complicated and that efficient molding is retarded.

Accordingly, attempts have made to first mold a connecting portion which connects a plurality of the metal terminals to be used as inserts and then to mold while the first molded article is being used as an insert. However, when a gap is slightly formed at the interface between the primary molded article and the secondary molded article and a gap is formed at the interface around the connecting portion which connects a plurality of the metal terminals, moisture produced by dew formation may gather in the gap to form a water film among the metal terminals. As a result, the insulation resistance among the metal terminals may decrease.

SUMMARY OF THE INVENTION

The present invention has been achieved in view of the problems as mentioned above. An object of the present invention is to provide a molded article having an electrical connection which prevents a decrease in the insulation resistance among metal terminals and which makes it possible to produce the molded article with good workability.

The molded article of the present invention which solves the problems as mentioned above comprises;

a first member comprising a connecting portion which is composed of a synthetic resin, which connects a plurality of metal terminals of an electrical connection, and which has edges formed among the metal terminals, and a second member which is a molded article having a desired shape and which is obtained by insert molding while the first member is being used as an insert.

BRIEF DESCRIPTION OF THE DRAWINGS

FIG. 1 is a plan view of a molded article which is an embodiment of the present invention.

FIG. 2 is a cross-sectional view along line II—II of FIG. 1.

DESCRIPTION OF THE PREFERRED EMBODIMENTS

During insert molding of the first member of the molded article in the molded article of the present invention having the structure as described above, the edges of the first member which have a particularly small heat capacity are melted by the heat of the second member. As a result, the interface between the first member and the second member disappears at the edges, and a gap which is likely to be formed at the interface disappears at the edge portions.

Although moisture tends to gather in the gap owing to dew formation when the molded article is used for a long period of time, the formation of a water film connecting the metal terminals is prevented as a result of the melting of the edges among the metal terminals of the connecting portion. A decrease in the insulation resistance among the metal terminals can thus be prevented.

The edges may be formed by either recesses, protrusions, or recesses and protrusions. When the recesses, the protrusions, or recesses and protrusions are formed in the connecting portion among the metal terminals, the creeping distance among the metal terminals is extended. Consequently, the formation of a continuous water film is further prevented, and a decrease in the insulation resistance among the metal terminals can be prevented.

Furthermore, a pool is formed in the recesses, etc., and moisture gathers in the pool. As a result, no water film continuously connecting the metal terminals is formed, and a decrease in the insulation resistance among the metal terminals can further be prevented.

Still furthermore, when a sealing material having adhesion and elasticity is allowed to adhere to the peripheries of a plurality of the metal terminals, the sealing material thoroughly seals the gap formed around the metal terminals, and the invasion of moisture, etc. from the outside can be prevented.

Embodiments of the present invention will be explained with reference to the drawings.

FIG. 1 shows a plan view of an instrument case molded from a synthetic resin. FIG. 2 shows a cross-sectional view of the instrument case. The instrument case is provided with an electrical connection 1. Recesses 2, 3 into which respective connectors are to be inserted from the outside and the inside of the electrical connection are formed on both sides of the electrical connection 1. At the same time, a plurality of metal terminals 4 are insertion molded in such a manner that the metal terminals penetrate the recesses 2, 3.

Figure 3:
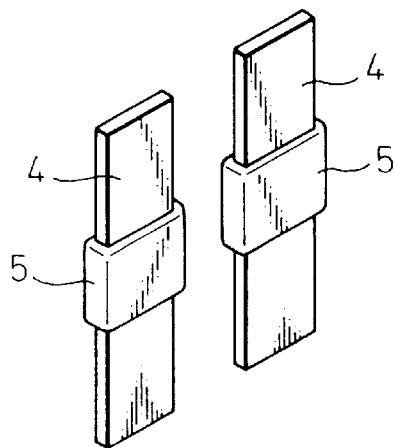
FIG. 3 is a perspective view of metal terminals.

To mold the instrument case, the periphery of the approximately central portion of each metal terminal 4 (conductive metal such as a copper alloy) is firstly coated with a sealing material 5 (such as a hydrin rubber) having adhesion and suitable elasticity, as shown in FIG. 3, and the sealing material is cured.

Figure 4:
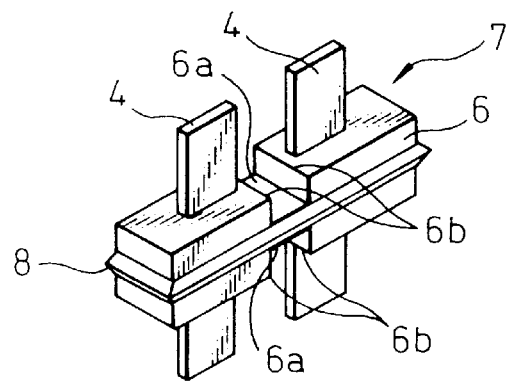
FIG. 4 is a perspective view of a primary molded article.

A primary molded article 7 as a first member is subsequently insert molded from a thermoplastic resin such as a polyacetal while a plurality of the metal terminals 4 are being used as inserts. The primary molded article 7 is provided with a connecting portion 6 which connects the two metal terminals 4, and at the same time recesses 6a are formed in the upper portion and the lower portion of the connecting portion 6. Edges 6b are formed by the recesses. Moreover, a flange 8 having an acute-angled edge is formed around the primary molded article 7 (FIG. 4).

Next, an instrument case is insert molded while the primary molded article 7 is being used as an insert, so that an electrical connection 1 is provided in part of the instrument case. That is, the primary molded article 7 is placed as an insert within a mold having a cavity with a predetermined shape, and the mold is closed, followed by injecting a molten thermoplastic resin such as a polyacetal into the cavity. The heat of the molten synthetic resin melts the surface of the primary molded article 7 contacted with the molten resin, particularly the edges 6b having a small heat capacity, during the injection. The injected resin is then solidified, and the molded article is taken out.

In addition, though the number of the metal terminals 4 is two in the figure, the number is usually from 5 to 10 or more. When the number of the metal terminals is as many as described above or when the number of molded articles as inserts for insert molding is plural, a plurality of the primary molded articles are prepared by molding, and insert molding is conducted while a plurality of the primary molded articles are being used as inserts.

As described above, the small size primary molded articles are molded while the metal terminals are being used as inserts, and then the instrument case, namely a large size secondary molded article is prepared by molding while the primary molded articles are being used as inserts. Accordingly, placing the inserts is easy as compared with molding a molded article having a relatively large size while small numerous metal terminals are being placed in the mold without preparing the primary molded articles, and the deformation and the position shift of inserts caused by an injection pressure, and the run-out of the sealing material can be prevented.

The instrument case thus molded contains various control circuits and electrical apparatuses not shown in the figure. Connectors of lead wires from the circuits and the apparatuses (not shown) are inserted into the inner recesses 3 of the electrical connection 1, and thus electrically connected to the metal terminals 4. Moreover, connectors are connected in the same manner from the outside to the outer recesses 2 of the electrical connection 1.

When such an instrument case is used as an electrical apparatus, etc. in a relatively high temperature, high humidity atmosphere for a long period of time, moisture tends to invade through a narrow gap formed at the interface between the primary molded article 7 and the secondary molded article (instrument case), and form dew in the gap. However, in the present invention, the edges 6b are formed in the mid positions of the connecting portion which connects the metal terminals 4, and the edges 6b are melted during secondary molding by the heat of the molten material. As a result, the interface disappears at the edges.

Accordingly, even when a gap is partially formed between the primary molded article 7 and the secondary molded article, a gap is not formed in part of the portion connecting the metal terminals 4 because the edges 6b have been melted, and the formation of a water film in the portion can be prevented. A decrease in the insulation resistance among the metal terminals can thus be prevented.

Even if the melting of the edges 6b is incomplete and a gap is formed, water gathers in the recesses 6a to form a pool because the recesses 6a are formed in the mid positions of the connecting portion. Consequently, moisture does not gather between the connecting portion and the case except for the recesses 6a, and the formation of a continuous water film connecting the metal terminals 4 is prevented. A decrease in the insulation resistance can thus be prevented.

Furthermore, since the periphery of each metal terminal 4 penetrating from the inside to the outside of the instrument case is sealed with the sealing material 5, the invasion of moisture, etc. can be prevented.

Figure 5:
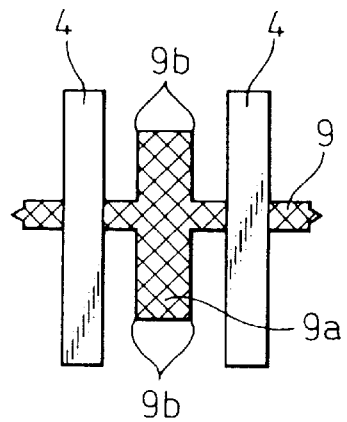
FIG. 5 is a cross-sectional view of a primary molded article in another embodiment.
Figure 6:
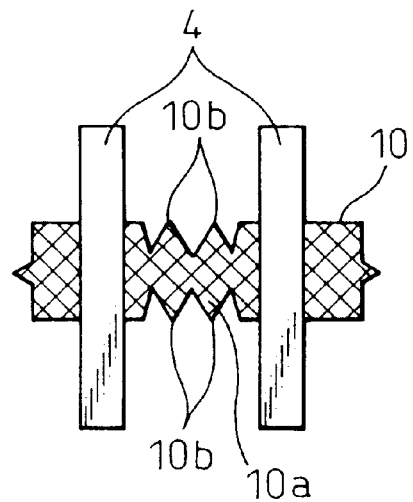
FIG. 6 is a cross-sectional view of a primary molded article in another embodiment.

FIG. 5 and FIG. 6 show other embodiments of the primary molded article. As shown in the primary molded article in FIG. 5, protrusions 9a may be formed on the upper and the lower sides in the mid positions of a connecting portion 9 which connects metal terminals 4, and edges 9b may be formed by the protrusions. As shown in the primary molded article in FIG. 6, recesses and protrusions 10a may be formed in the upper and the lower mid positions of a connecting portion 10, and edges 10b may also be formed by the recesses and protrusions.

When a secondary molded article is formed while a primary molded article, having a connecting portion 9 or 10 in which edges 9b or 10b are formed, is being used, a portion having no interface can be prepared in part of the connecting portion in the same manner as described above. As a result, the formation of a water film connecting the metal terminals 4 can be prevented. Furthermore, the formation of a continuous water film may also be prevented owing to the extension of the creeping distance of the connecting portion which connects the two metal terminals 4. A decrease in the insulation resistance between the metal terminals 4 can thus be prevented.

Figure 7:
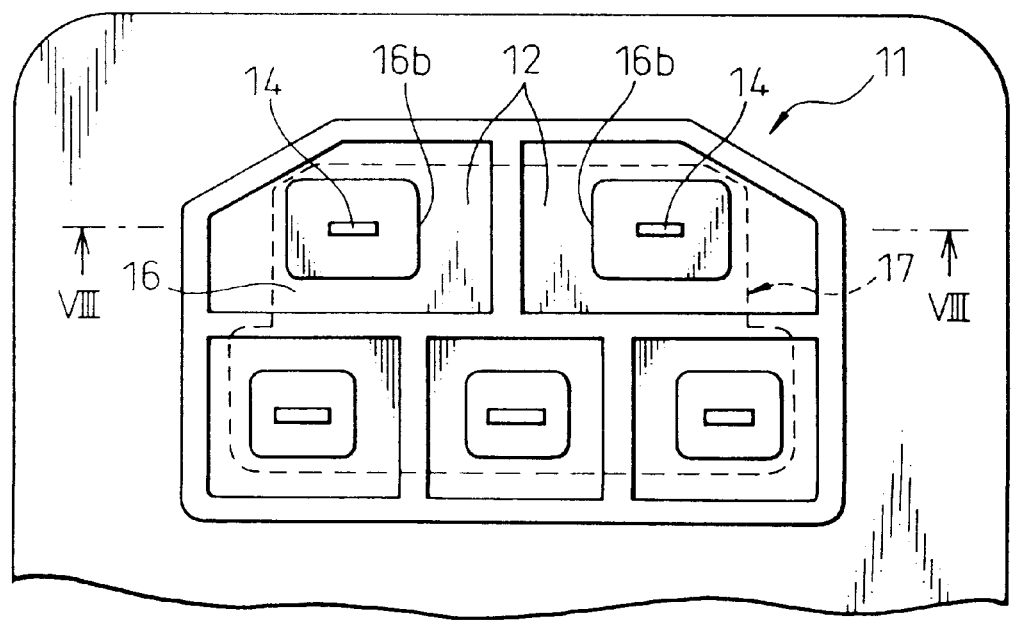
FIG. 7 is a plan view of a molded article in another embodiment.
Figure 8:
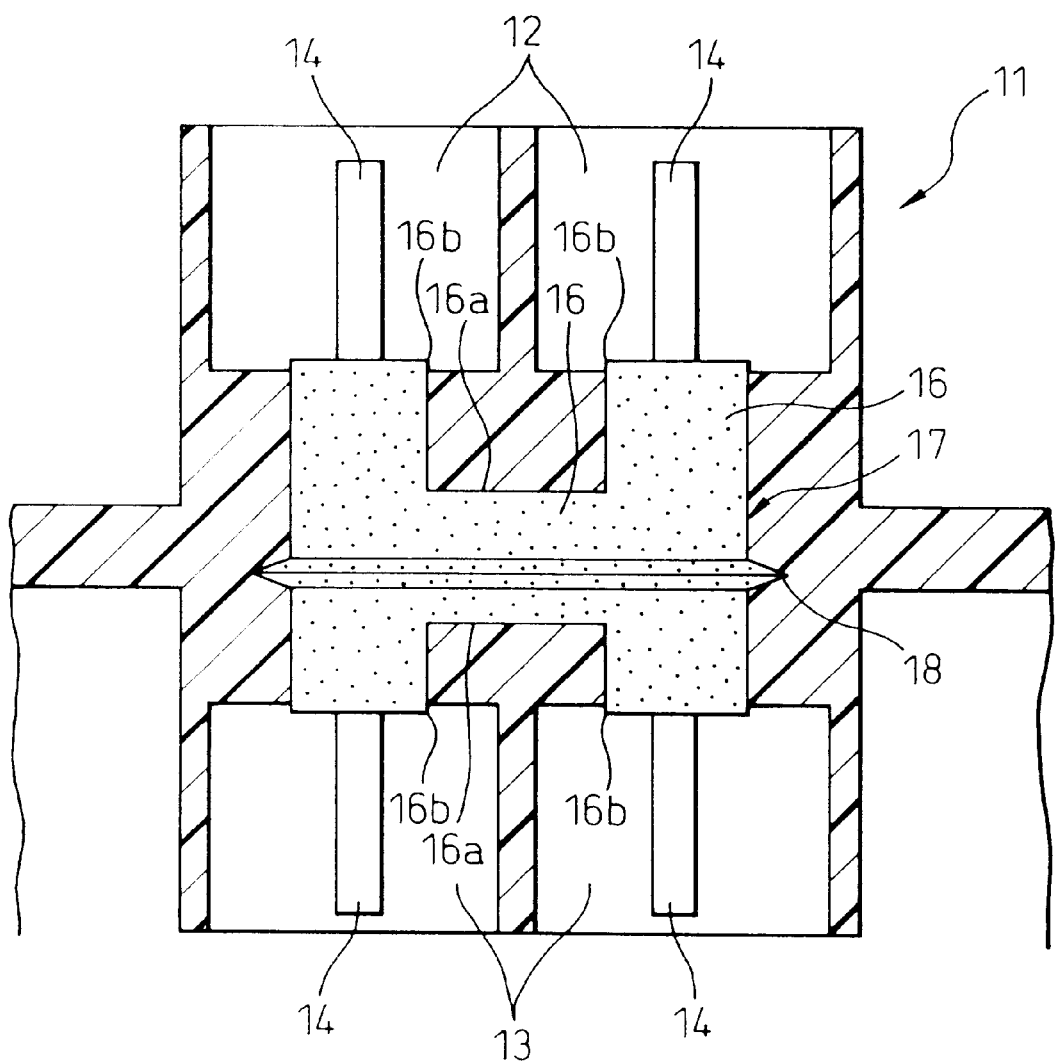
FIG. 8 is a cross-sectional view along line VIII—VIII of FIG. 7.

FIG. 7 and FIG. 8 show another embodiment. An electrical connection 11 of the instrument case is basically the same as that described above. That is, recesses 12, 13 into which connectors are to be inserted from the outside and the inside of the electrical connection 11 are formed on both sides thereof. At the same time, a plurality of metal terminals 14 are insert molded in such a manner that the metal terminals penetrate the recesses 12, 13.

The peripheries of the metal terminals 14 are coated with a sealing material (not shown) having adhesion and elasticity, and a primary molded article 17 is prepared by molding while the metal terminals 14 are being used as inserts.

The primary molded article 17 prepared by insert molding the metal terminals 14 is formed in such a manner that the molded article has a connecting portion 16 connecting the metal terminals 14, that recesses 16a are provided in the mid positions of the connecting portion 16, and that edges 16b are formed at the corners of the recesses. Moreover, a flange 18 having an acute-angled edge is formed around the primary molded article 17.

The instrument case is formed by molding a secondary molded article while the primary molded article 17 is being used as an insert. That is, the primary molded article 17 is inserted into a predetermined mold as an insert, and a molten thermoplastic resin such as a polyacetal is injected into the cavity of the mold to form a molded article having the shape of the electrical connection 11.

As shown in FIG. 7 and FIG. 8, the electrical connection 11 of the instrument case thus molded has a shape in which the metal terminals 14 are projected in the recesses 12, 13, and is formed in such a manner that the edges 16b are slightly projected and exposed in the recesses 12, 13.

In such an electrical connection 11, the edges 16b are formed on the connecting portion which connects the metal terminals 14, and the edges are exposed. As a result, even when a gap is formed between the primary molded article 17 and the secondary molded article and water invades the gap, a water film is not formed on the connecting portion around the metal terminals 14 owing to the exposure and the protrusion of the edges. Consequently, the formation of a continuous water film connecting the metal terminals 14 can be hindered, and a decrease in the insulation resistance can be prevented.

Furthermore, since the recesses 16a are formed in the mid positions of the connecting portion 16, water gathers in the recesses 16a to form a pool. As a result, moisture does not gather between the connecting portion other than the recesses 16a and the case. Accordingly, the formation of a continuous water film connecting the metal terminals 14 can be hindered, and a decrease in the insulation resistance can be prevented.

We claim:

1. A molded article having an electrical connection, comprising
    a first member comprising a connecting portion which is composed of a synthetic resin, which connects a plurality of metal terminals of the electrical connection, and which has edges formed among the metal terminals, and
    a second member which is a molded article having a desired shape and which is formed by insert molding while the first member is being used as an insert in such a manner that the edges are exposed, said second member comprising at least one partition wall provided between respective adjacent metal terminals for substantially isolating said respective adjacent metal terminals from one another.

2. The molded article having an electrical connection according to claim 1, wherein the edges are formed by either recesses, protrusions, or recesses and protrusions.

3. The molded article having an electrical connection according to claim 1, wherein a sealing material having adhesion and elasticity is allowed to adhere to the peripheries of a plurality of the metal terminals.

4. The molded article of claim 1, wherein said second member is formed by insert molding a thermoplastic resin onto the first member.

5. The molded article of claim 1, wherein said exposed edges are edges provided in the connecting portion.

6. The molded article of claim 1, wherein said exposed edges are edges formed in sections of the connecting portion surrounding the metal terminals.

7. A molded article having an electrical connection, comprising
    a first member comprising a connecting portion which is composed of a synthetic resin, which connects a plurality of metal terminals of the electrical connection, and which has edges formed among the metal terminals, and
    a second member which is a molded article having a desired shape and which is formed by insert molding while the first member is being used as an insert in such a manner that sections of the first member surrounding the metal terminals are projected from the second member to form a surface level difference between the first and second members among the metal terminals, said second member comprising at least one partition wall provided between respective adjacent metal terminals for substantially isolating said respective adjacent metal terminals from one another.

* * * * *